Feb. 23, 1937.  W. SHURTLEFF  2,071,904
DIRECT READING COMFORTABLE TEMPERATURE INDICATOR
Original Filed Dec. 29, 1930
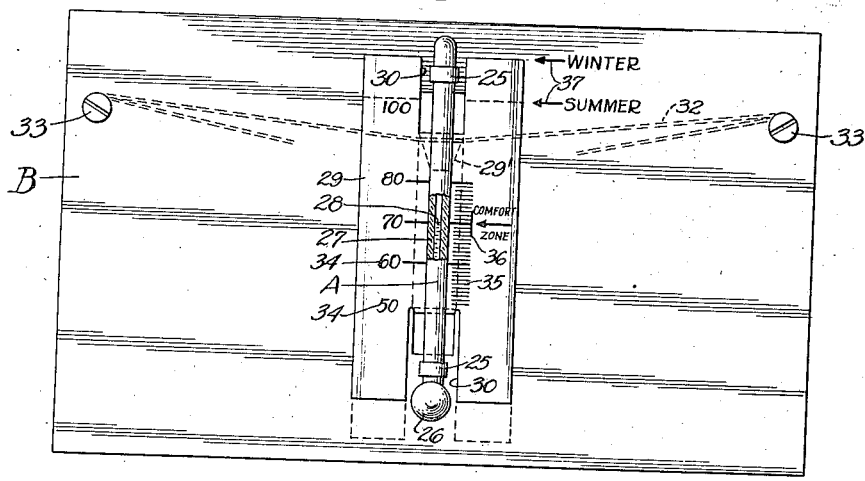
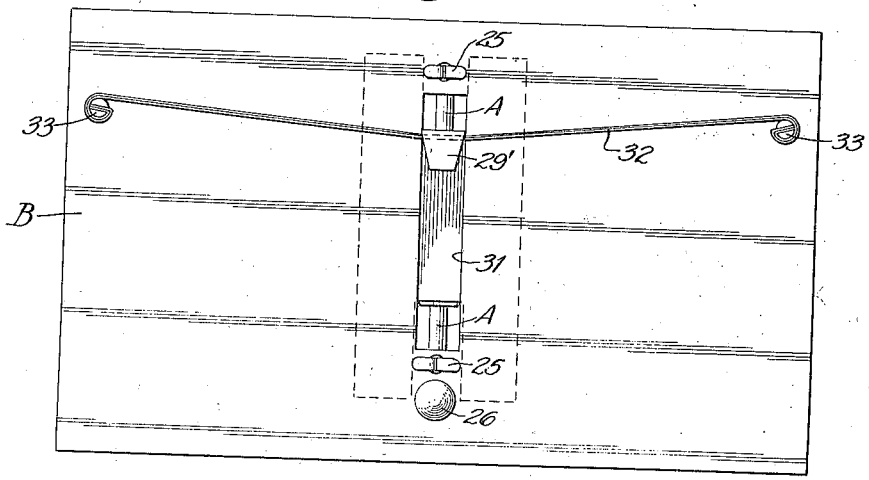
Inventor:
Wilfred Shurtleff,
By Binning & Binning
Attys.

Patented Feb. 23, 1937

2,071,904

UNITED STATES PATENT OFFICE 2,071,904

DIRECT READING COMFORTABLE TEMPERATURE INDICATOR

Wilfred Shurtleff, Moline, Ill., assignor to The Herman Nelson Corporation, Moline, Ill., a corporation of Illinois Original application December 29, 1930, Serial No. 505,294. Divided and this application June 3, 1935, Serial No. 24,598

4 Claims. (Cl. 73—24)

This invention relates to direct reading comfortable temperature indicators.

In using the term "comfortable temperature" or "effective sensible temperature", it is intended to refer to that condition resulting from the combination of dry bulb temperature and relative humidity, which is considered to be conducive to physical comfort, as distinguished from dry bulb temperature without reference to relative humidity, and as distinguished from relative humidity without reference to dry bulb temperature.

It is well recognized that comfortable temperatures are governed to a large degree by the relative humidity of the air, and not merely by the temperatures indicated by the so-called dry bulb thermometers. Experiments have shown, for instance, that a given dry bulb temperature commonly thought to be desirable for physical comfort becomes very uncomfortable when the relative humidity is increased, and, on the other hand, a given dry bulb temperature commonly considered undesirable for physical comfort may be made comfortable by an increase or decrease in the relative humidity.

Dry bulb thermometers have been in use and are commonly known as indicators of dry bulb temperature. These thermometers include many different types of materials responsive to changes in dry bulb temperature, all of which give no indication of the relative humidity which is so important a factor in the condition which effects comfortable temperatures. Devices or instruments for measuring moisture conditions, or relative humidity, are also available. With the devices available attempts have been made to use an aggregation of a dry bulb thermometer and a wet bulb or humidity thermometer side by side, and, by the use of a chart in connection with the individual readings of these instruments, determine whether the particular condition represented by these two readings is within the range of comfortable temperatures. All of the attempts along these lines are naturally too complicated for the layman to determine whether the particular condition is within the range of comfortable temperatures.

The object, therefore, of this invention, is to provide an indicating instrument which is jointly responsive to both dry bulb temperature and relative humidity and arranged to directly indicate the resultant or combination of the two factors producing this resultant or combination.

Other objects of the invention will appear hereinafter.

Referring to the accompanying drawing—

Figure 1 is a front view in elevation of a modified type of instrument employing the principles of my invention; and Fig. 2 is a rear view of the structure shown in Fig. 1.

This is a division of my co-pending application Serial No. 505,294, filed December 29, 1930, which has resulted in Patent No. 2,010,040, granted August 6, 1935.

As hereinbefore stated, it is well known that the conditions in an inhabited zone or room are affected by both the dry bulb temperature and the relative humidity, and that within a certain range the combinations of dry bulb temperature and relative humidity are productive of results which are considered comfortable temperatures. Deviations of one of the factors in this comfort zone or range, should be compensated for by a corresponding change of the other factor to provide a combination which is sensibly comfortable. For instance, assuming a dry bulb temperature of 72° provides an ideal or desirable comfortable temperature only when the relative humidity is about 50%. If for any reason the relative humidity at this dry bulb temperature should increase to, say, 90%, a comfortable temperature could still be maintained by correspondingly reducing the dry bulb temperature to, say, 67°. In other words, the comfortable temperature with this change in both factors would be sensibly the same as when the condition consisted of a dry bulb temperature of 72° with a relative humidity of 50%. In controlling room conditions, it is more practical to vary the dry bulb temperature by regulating the heating means in the room to conform the dry bulb temperature to whatever conditions of relative humidity may exist at the time.

Since in my present invention the readings or indications are those of the resultants of the two component factors which make up comfortable temperature, the instrument is of particular advantage as a means for checking the regulating devices which are used for varying the dry bulb or relative humidity conditions to maintain the desired comfortable temperature.

In the instrument shown in Fig. 1, an ordinary or usual type dry bulb thermometer A, responsive to dry bulb temperature, is fixedly mounted upon a suitable base B by means of the clips 25 at its upper and lower ends. This thermometer has the usual bulb 26 at its lower end and a column of mercury or colored alcohol 27 in the tube thereof, the rise and fall of the level 28 of said column of liquid indicating the temperature variations. In this structure the calibrated scale 29 is given movement relatively to the dry bulb thermometer by means of the humidity responsive element. The scale preferably consists of a flat plate adapted to slide vertically on the front surface of the base B. It is provided with open-ended slots 30 at its upper and lower ends to clear the clips 25 holding the thermometer A in position. The scale is positioned between the base and the thermometer and has a rearward hook 29' at its upper end portion which extends through an elongated slot 31 in the base. This clip engages the humidity responsive element 32 which extends across the back of the base and parallel thereto, the arrangement being such that the scale is hung or suspended from the center of this member 32 by the hook member 29'. The humidity responsive element 32 is preferably in the form of a plurality of strands of hair which are extended between two outstanding screws or studs 33 on the back of the base and are anchored to these screws. By rotating one or both of the screws, the sag or catenary of the strands of hair can be varied to accurately position the suspended scale relatively to the dry bulb thermometer. Strands of human hair are very effective for this purpose because of the well known properties of hair which cause it to change its length with variations in humidity. The scale 29 is provided with numerals 34 and calibrations 35. In like manner, the scale is also provided with the heavy mark 36 indicating the comfort zone, thus making the instrument direct reading so that the relative movement of the scale and column of liquid in the thermometer in response to the dry bulb temperatures and humidity conditions may be directly observed in terms of degrees on the scale.

On the face of the base are two arrows 37 designated "Winter" and "Summer", these arrows being positioned adjacent the top edge of the movable scale. The position of the top edge of the scale, with respect to these arrows, serves to indicate at a glance whether the instrument is properly adjusted in a rough way: that is, in the winter season the sag or catenary should be adjusted to position the top edge of the scale near the arrow marked "Winter", and in the summer season near the arrow marked "Summer". This provides a coarse adjustment of the instrument for each season of the year. The reason for this coarse setting is that in the summer the air humidity is nearly always between 60% and 100%, and in winter the humidity is between 20% and 40%, or quite dry.

Thus it will be seen that I have provided a device which reads directly in terms of comfortable temperatures and which takes account of both the humidity and the dry bulb temperature conditions of the atmosphere.

I claim:

1. In an indicating instrument of the character described, the combination of a fixed dry bulb thermometer, a humidity responsive device having strands of hair secured to spaced members so as to be movable by contraction and expansion in response to humidity variations, and a movable scale suspended on said strands of hair and positioned in juxtaposition to the movable means of said temperature responsive device for indicating the resultant of the relative movement of said scale and temperature responsive movable means.

2. A device of the character described, comprising a plurality of means supported on a base, one of which is a liquid thermometer carried on the base and responsive to dry bulb temperature conditions, and the other of which comprises hair secured to spaced members on the base to form horizontal strands responsive to humidity conditions, and a scale carried by the strands of hair and calibrated in degrees of effective sensible temperature, said scale cooperating with the thermometer to indicate therewith a resultant of the temperature and humidity responses.

3. A device of the character described, comprising a liquid thermometer means responsive to dry bulb temperature conditions, a scale means, a base having spaced supports, a strand of hair responsive to humidity conditions and carried on the supports, one of said means being carried by the base while the other is suspended on the strand of hair, the scale being calibrated in degrees of effective sensible temperature, said scale cooperating with the thermometer to indicate therewith a resultant of the temperature and humidity responses.

4. In a device of the character described, the combination of a scale slidable on a support and calibrated in degrees of effective sensible temperature, actuating means for moving said scale comprising strands of hair as an element responsive to variations in moisture conditions, said strands being secured to fixed spaced members to form a horizontal strand, the scale being attached to the strand substantially midway of the latter, a liquid element responsive to variations in dry bulb temperatures and arranged to indicate said variations on said scale in relation to the movement of the scale by said actuating means, and means for tensioning the strands for adjusting the position of said scale relative to the liquid element.

WILFRED SHURTLEFF.